United States Patent
Broussard et al.

(10) Patent No.: US 10,343,640 B2
(45) Date of Patent: Jul. 9, 2019

(54) AIRBAG HOUSING FOR AN AIRBAG MODULE

(71) Applicant: AUTOLIV DEVELOPMENT AB, Vargarda (SE)

(72) Inventors: Marco Broussard, Dachau (DE); Harald Schuler, Niederroth (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/589,712

(22) Filed: May 8, 2017

(65) Prior Publication Data

US 2017/0320459 A1 Nov. 9, 2017

(30) Foreign Application Priority Data

May 9, 2016 (DE) .......................... 10 2016 108 516

(51) Int. Cl.
*B60R 21/215* (2011.01)
*B60R 21/217* (2011.01)

(52) U.S. Cl.
CPC ........ *B60R 21/215* (2013.01); *B60R 21/2176* (2013.01)

(58) Field of Classification Search
CPC . B60R 21/215; B60R 21/217; B60R 21/2171; B60R 21/2176; B60R 21/2177
See application file for complete search history.

(56) References Cited

U.S. PATENT DOCUMENTS

| | | | | |
|---|---|---|---|---|
| 5,310,213 A * | 5/1994 | Mori | .................... | B60R 21/2171 220/4.23 |
| 5,405,164 A * | 4/1995 | Paxton | ................ | B60R 21/2171 280/728.2 |
| 5,433,472 A * | 7/1995 | Green | ................. | B60R 21/2171 280/728.2 |
| 5,577,764 A * | 11/1996 | Webber | ............... | B60R 21/2171 280/728.2 |
| 6,039,341 A * | 3/2000 | Doxey | ................ | B60R 21/2176 280/728.2 |
| 6,394,485 B1 * | 5/2002 | Amamori | ............ | B60R 21/2171 280/728.2 |
| 6,422,589 B1 * | 7/2002 | Ostermann | ......... | B60R 21/2171 280/728.2 |
| 6,846,005 B2 * | 1/2005 | Ford | .................... | B60R 21/2171 280/728.2 |
| 7,325,823 B2 * | 2/2008 | Dannenhauer | ...... | B60R 21/2171 280/728.2 |
| 8,360,464 B2 * | 1/2013 | Enders | .................. | B60R 21/206 280/728.2 |

(Continued)

FOREIGN PATENT DOCUMENTS

DE 297 06 900 U1 8/1997
DE 10 2004 054 528 A1 5/2006
DE 20 2011 002 778 U1 11/2011

*Primary Examiner* — Laura Freedman
(74) *Attorney, Agent, or Firm* — Brinks Gilson & Lione

(57) ABSTRACT

An airbag housing with a receiving space for a gas generator and an airbag, wherein the receiving space is confined at least by a bottom, side walls, and end walls connecting the side walls, and wherein a fastening section projects from at least one of the walls enabling the airbag housing to be fastened to a vehicle. The bottom, the side walls, the end walls, and the fastening section are formed from a single sheet metal blank.

22 Claims, 3 Drawing Sheets

(56) References Cited

U.S. PATENT DOCUMENTS

| | | |
|---|---|---|
| 8,454,050 B2 | 6/2013 | Schorle et al. |
| 8,500,155 B2 * | 8/2013 | Enders ................. B60R 21/205 |
| | | 280/728.2 |
| 8,955,877 B2 | 2/2015 | Broussard et al. |
| 2009/0058052 A1 | 3/2009 | Ford et al. |
| 2010/0059974 A1 | 3/2010 | Chevalier et al. |

* cited by examiner

AIRBAG HOUSING FOR AN AIRBAG MODULE

CROSS-REFERENCE TO RELATED APPLICATIONS

This application claims priority under 35 U.S.C. § 119 to German Patent Application Serial No.: DE 10 2016 108 516.2, filed May 9, 2016, the disclosure of which is incorporated herein by reference.

FIELD OF THE INVENTION

The invention relates to an airbag housing for a motor vehicle airbag assembly with a receiving space for a gas generator and an airbag, wherein the receiving space is confined at least by a bottom, side walls, and end walls connecting the side walls, and wherein a fastening section projects from at least one of the walls thereby enabling the airbag housing to be fastened to a vehicle.

BACKGROUND OF THE INVENTION

An airbag housing with the aforementioned features is known from U.S. Pat. No. 8,454,050 B2. The end walls are each formed by separate components which are attached to the side walls by means of a plug connection and are attached to the fastening section of the airbag housing during the fastening of the airbag housing to the vehicle. For the production of the airbag housing, several components are separately manufactured, which must be assembled in several steps.

It is therefore an object of the present invention to provide a solution to the drawbacks described with reference to the prior art and, in particular, to provide an airbag housing which is simpler and more economical to manufacture.

SUMMARY AND INTRODUCTORY DESCRIPTION OF THE INVENTION

The above-mentioned object is achieved by an airbag housing having features described herein.

The object is achieved, in particular, by an airbag housing with the aforementioned features, wherein the bottom, the side walls, the end wall and the at least one fastening section being formed from a one-part metal sheet.

Thus, the receiving space is confined by sides by the side walls, the end walls and the bottom, wherein the sixth side of the receiving space is closed by a cover after inserting the gas generator and the gas bag in the receiving space. The side walls extend, in particular, parallel to the longitudinal direction of the airbag housing, while the end wall extends transversely to the longitudinal direction of the housing with one end wall connecting the side walls in each case. Thus, the end walls extend from one side wall to the opposite side wall. In particular on the side walls, elements such as hook-shaped brackets can be formed, enabling the cover to be fixed to the airbag housing. Particularly in the bottom of the airbag, ribbings can be formed enabling the airbag housing to be stabilized against mechanical deformations. These ribbings can also extend into the side walls and optionally into the end walls.

In particular, two fastening sections are formed, each of which projects above one of the end walls, in particular in a plane of the bottom. Preferably at least one hole is formed in the fastening sections, enabling the fixing of the airbag housing to a vehicle.

Since the airbag housing is formed from a single metal sheet, it can be blanked from a sheet metal using just a single tool. The further processing by inserting ribbings, for example, or bending the punched metal sheet can be carried out in one operation or in one machine for example in a metal pressing operation. Thus, there is no need to machine several components. The invention allows the production of an airbag housing cost-effectively with fewer steps and with less loss of material, wherein a high stability of the airbag housing is provided by connecting the opposing side walls by means of the end walls.

Preferably, at least one recess is formed in an end wall for the passage of a connecting element of the gas generator. For example, a plug, a cable harness or similar elements can be passed through the recess for connecting with the gas generator.

It is particularly preferred in this case the said recess is an opening which is completely surrounded by the end wall. This means that the opening is a kind of hole through which the connecting element can be passed. The formation of an opening completely surrounded by the end wall allows the formation of a very stable end wall.

Alternatively, it can be provided that the recess is a cut-out which extends to an edge of the metal sheet. Thus, the recess is not completely surrounded by the material of the end wall.

In particular, in each case a fastening section projects from the bottom from an end wall. Thus, two fastening sections are arranged on opposing sides of the airbag housing. In order to increase the stability of the airbag housing, in particular in the area of a fastening section, it can be provided that at least one ribbing extends in the metal sheet from the bottom into the fastening section.

In one embodiment, it can be provided that at least one ribbing, preferably two or three ribbings, extend(s) exclusively rectilinear in the longitudinal direction of the airbag housing. Thus, several ribbings, in particular arranged parallel to one another, can be formed, each of which extends from the bottom into a fastening section.

Alternatively, it can be provided that at least one, preferably precisely one, ribbing extends at least in the fastening section at least in sections transversely to the longitudinal direction of the airbag housing. In particular, a ribbing is V-shaped in the area of the fastening section. The ribbing can be formed in any other shape provided that the ribbing extends at least in sections transversely to the longitudinal direction of the airbag housing. This means that a tangent to the ribbing in the area extending transversely to the longitudinal direction will intersect the longitudinal direction of the airbag housing at an angle.

The end walls, which are formed in one part with the side walls and the bottom, are formed, in particular, by bending sections of the metal sheet which project from at least one side wall. In this case, it can be provided in particular that the end walls in each case are formed by two bent sections, which are formed on opposite side walls, which are connected to one another in the respective end wall, for example, by rivets or welded joints.

In an embodiment, in which an end wall does not completely extend in a single plane it can be provided in particular that the opening is formed in an area of the end wall, which is inclined towards the end walls as well as towards the remaining area of the end wall.

The airbag housing in accordance with this invention is used, in particular, in an airbag module, such as a passenger airbag module, side airbag module or knee airbag module, wherein a cover closing the receiving space is fastened to the airbag housing and a gas generator and an airbag are arranged in the receiving space.

BRIEF DESCRIPTION OF THE DRAWINGS

The invention as well as the technical environment are explained below by way of example with reference to the figures.

DETAILED DESCRIPTION

Figure 1:
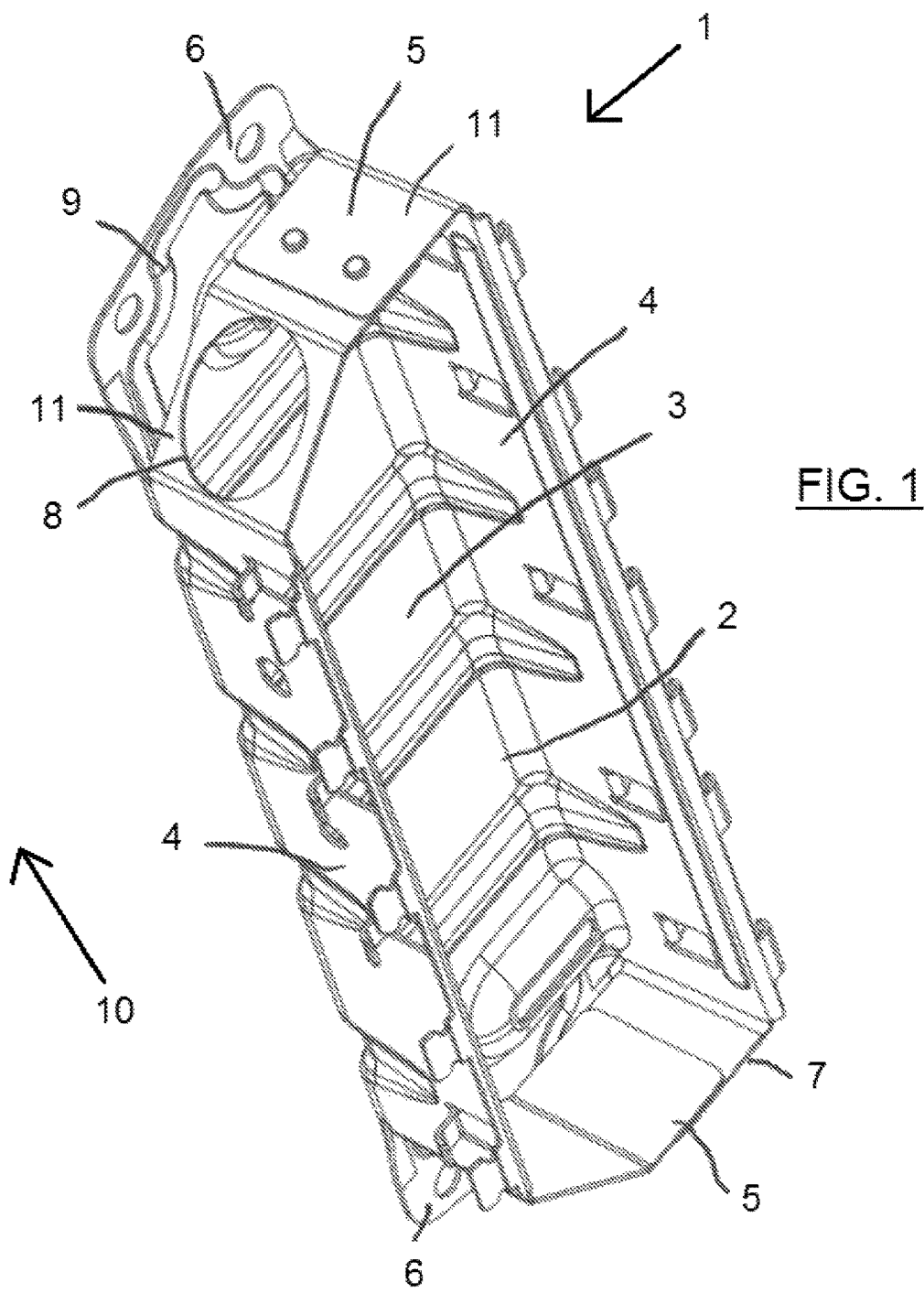
FIG. 1 shows schematically a perspective view of an airbag housing diagonally from the top.
Figure 2:
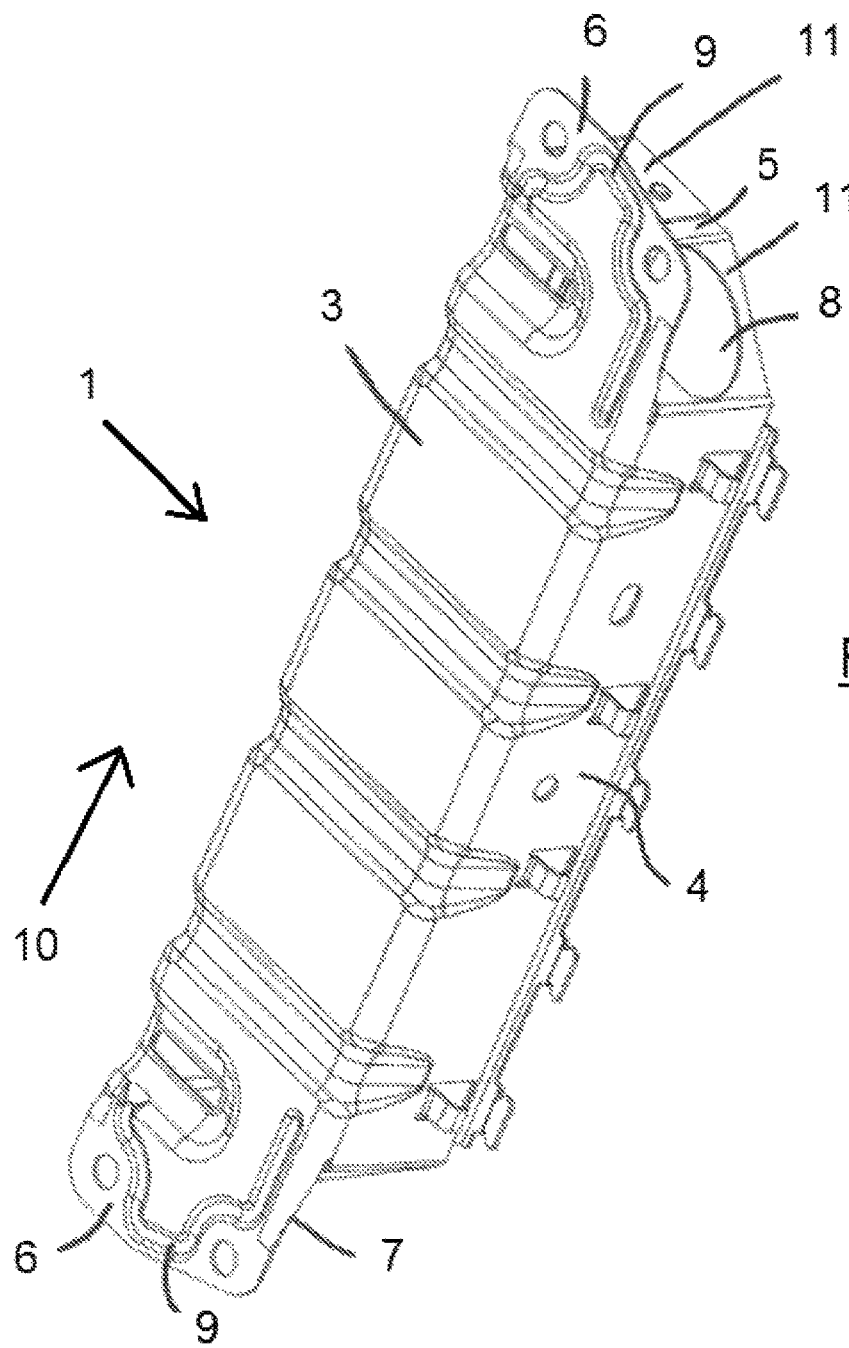
FIG. 2 shows schematically another perspective view of the airbag housing diagonally from the bottom.
Figure 3:
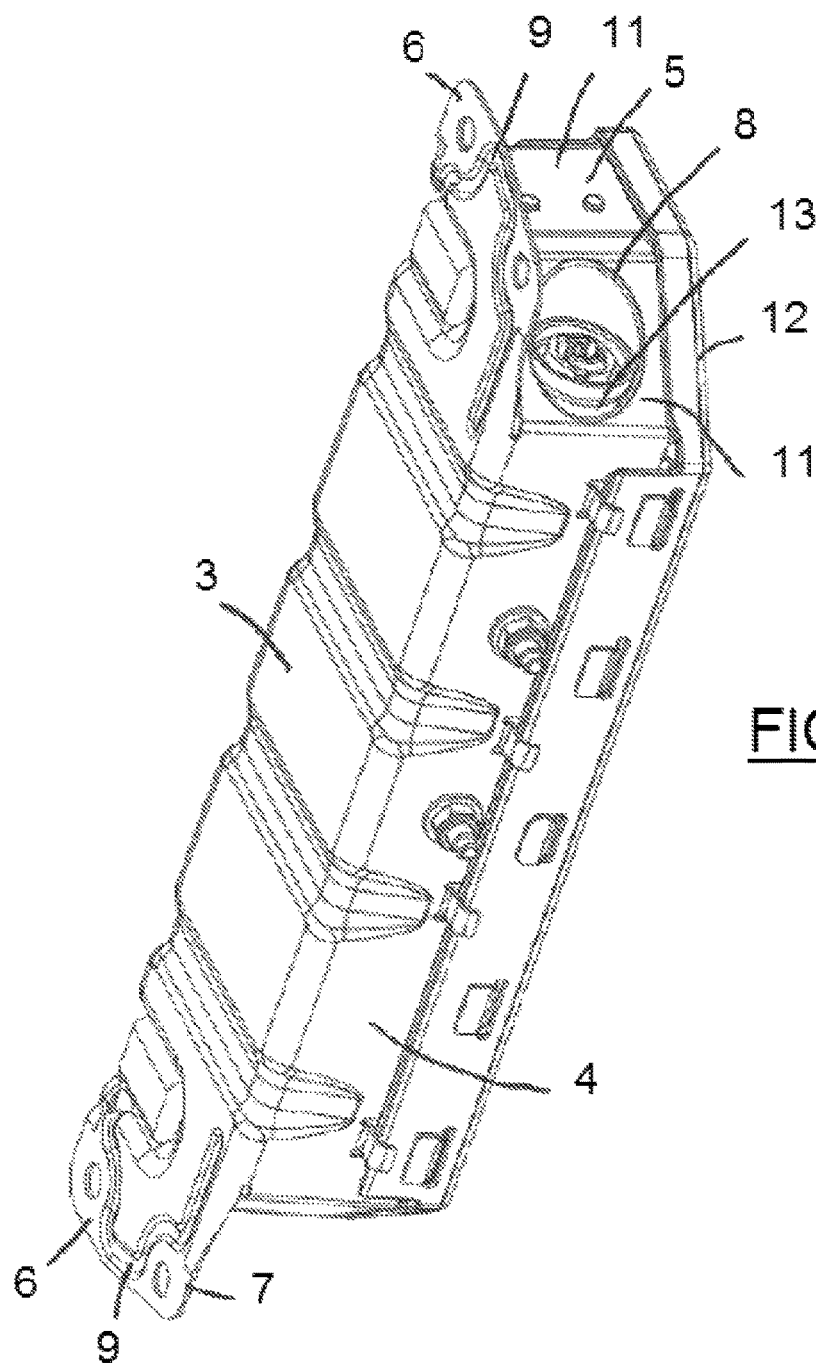
FIG. 3 shows schematically the airbag housing in the view of FIG. 2 with a gas generator and a cover.

The figures show schematically an airbag housing 1 with opposing side walls 4, opposing end walls 5 and a bottom 3. Bottom 3, side walls 4 and end walls 5 confine a receiving space 2, in which a gas generator 13 and a gas bag can be arranged. In the assembled state, receiving space 2 is closed by a cover 12 (shown in FIG. 3) which is fastened to airbag housing 1 by fastening brackets formed on side walls 4.

Airbag housing 1 has two fastening sections 6 which project in the plane of floor 3 from end wall 5. Holes are formed in fastening sections 6, through which a fastener can be passed, so that airbag housing 1 can be fastened to a vehicle.

In end walls 5, recesses 8, which are completely surrounded by one of the end walls 5, are formed in the form of openings, through which electrical connecting elements for gas generator 13 can be passed.

Bottom 3, side walls 4, end walls 5, and fastening portion 6 are integrally formed from a single blank of metal sheet 7. End walls 5 are each formed from two metal sheet sections 11, which, initially projected from side walls 4 and have been bent to form end walls 5, and were joined to one another.

In the area of end walls 5, a ribbing 9 is formed in bottom 3, which in each case extends starting from bottom 3 into a fastening section 6. In fastening section 6, ribbing 9 extends in sections transversely to longitudinal direction 10 of airbag housing 1. Ribbing 9 stabilizes the fastening section and the transition area in bottom 3 against bending.

The invention claimed is:

1. An airbag housing for a vehicle with a receiving space for a gas generator and an airbag, comprising wherein the receiving space is bounded at least by a bottom, at least two side walls, and one or more end walls connecting the at least two side walls, and wherein a fastening section projects from at least one of the at least two side walls and the one or more end walls enabling the airbag housing to be fastened to the vehicle, and the bottom, the at least two side walls, the one or more end walls and the fastening section are formed integrally from a single metal blank sheet,
   at least one ribbing in the airbag housing extending from the bottom into the fastening section, and
   wherein the fastening section extends from the bottom adjacent to the one or more end walls along a plane of the bottom.

2. The airbag housing according to claim 1, further comprising at least one recess is formed in the one or more end walls for the passage of a connecting element of the gas generator.

3. The airbag housing according to claim 2, wherein the at least one recess comprises a first opening which is completely surrounded by one of the one or more end walls.

4. The airbag housing according to claim 2, further comprising the at least one recess is a cut-out which extends to an edge of the airbag housing.

5. The airbag housing according to claim 1, further comprising the at least one ribbing extends exclusively rectilinear in a longitudinal direction of the airbag housing.

6. The airbag housing according to claim 1, further comprising at least in the fastening section the at least one ribbing extends at least in sections transversely to a longitudinal direction of the airbag housing.

7. The airbag housing according to claim 1, further comprising the one or more end walls are formed by bending sections of the metal blank sheet projecting from at least one of the at least two side walls.

8. An airbag module with an airbag housing according to claim 1, further comprising a cover closing the receiving space and which is fastened to the airbag housing.

9. The airbag housing according to claim 1, further comprising the at least two side walls comprising a pair of mutually parallel separated side walls, portions of the one or more end walls comprising a pair of mutually parallel separated end walls.

10. An airbag housing for a vehicle with a receiving space for a gas generator and an airbag, comprising wherein the receiving space is bounded at least by a bottom, at least two side walls, and one or more end walls connecting the at least two side walls, and wherein a fastening section projects from at least one of the at least two side walls and the one or more end walls enabling the airbag housing to be fastened to the vehicle, and the bottom, the at least two side walls, the one or more end walls and the fastening section are formed integrally from a single metal blank sheet, and
   wherein at least one ribbing in the airbag housing extends from the bottom into the fastening section.

11. The airbag housing according to claim 10, further comprising the at least one ribbing extends exclusively rectilinear in a longitudinal direction of the airbag housing.

12. The airbag housing according to claim 10, further comprising at least in the fastening section the at least one ribbing extends at least in sections transversely to a longitudinal direction of the airbag housing.

13. An airbag housing for a vehicle with a receiving space for a gas generator and an airbag, comprising wherein the receiving space is bounded at least by a bottom, at least two side walls, and one or more end walls connecting the at least two side walls, and wherein a fastening section projects from at least one of the at least two side walls and the one or more end walls enabling the airbag housing to be fastened to the vehicle, and the bottom, the at least two side walls, the one or more end walls and the fastening section are formed integrally from a single metal blank sheet,
   at least one of the one or more end walls is formed by two bent portions formed by bending sections of the metal blank sheet and projecting from at least one of the at least two side walls which are connected to one another in the respective end wall, wherein the fastening section extends from the bottom adjacent to the one or more end walls along a plane of the bottom.

14. The airbag housing according to claim 13, further comprising at least one ribbing in the airbag housing extending from the bottom into the fastening section.

15. The airbag housing according to claim 14, further comprising the at least one ribbing extends exclusively rectilinear in a longitudinal direction of the airbag housing.

16. The airbag housing according to claim 14, further comprising at least in the fastening section the at least one ribbing extends at least in sections transversely to a longitudinal direction of the airbag housing.

17. The airbag housing according to claim 13, further comprising a first opening is formed in an area of the respective end wall, which is inclined towards the remaining area of the respective end wall from the connected area of the respective end wall.

18. The airbag housing according to claim 13, further comprising at least one recess is formed in the one or more end walls for the passage of a connecting element of the gas generator.

19. The airbag housing according to claim 18, wherein the at least one recess comprises a first opening which is completely surrounded by one of the one or more end walls.

20. The airbag housing according to claim 18, further comprising the at least one recess is a cut-out which extends to an edge of the airbag housing.

21. An airbag module with an airbag housing according to claim 13, further comprising a cover closing the receiving space and which is fastened to the airbag housing.

22. The airbag housing according to claim 13, further comprising the at least two side walls comprising a pair of mutually parallel separated side walls, portions of the one or more end walls comprising a pair of mutually parallel separated end walls.

\* \* \* \* \*